United States Patent
Hu et al.

(10) Patent No.: US 6,396,939 B1
(45) Date of Patent: May 28, 2002

(54) METHOD AND SYSTEM FOR SEGMENTATION OF MEDICAL IMAGES

(75) Inventors: Tao Hu; Francoys Labonté, both of Montreal (CA)

(73) Assignee: Orthosoft Inc., Montreal (CA)

( * ) Notice: Subject to any disclaimer, the term of this patent is extended or adjusted under 35 U.S.C. 154(b) by 0 days.

(21) Appl. No.: 09/321,489

(22) Filed: May 27, 1999

Related U.S. Application Data (60) Provisional application No. 60/087,090, filed on May 28, 1998.

(51) Int. Cl.[7] ................................................. G06K 9/00
(52) U.S. Cl. ........................................................ 382/128
(58) Field of Search ................................. 382/106, 128, 382/133, 159, 164, 165, 170, 171, 172, 173, 174, 190, 201, 203, 224, 225, 226, 227, 254, 260, 270, 275, 276, 282, 291, 294, 302, 305; 348/45, 65; 250/201.8, 582, 583, 584; 378/163, 165, 166; 600/407, 425, 443, 921; 128/922

(56) References Cited

U.S. PATENT DOCUMENTS

| | | | |
|---|---|---|---|
| 4,516,261 A | 5/1985 | Harding et al. | 382/131 |
| 4,630,203 A | 12/1986 | Szirtes | 382/132 |
| 4,835,688 A | 5/1989 | Kimura | 345/424 |
| 4,875,165 A | 10/1989 | Fencil et al. | 345/424 |
| 4,879,652 A | 11/1989 | Nowak | 378/4 |
| 4,882,679 A | * 11/1989 | Tuy et al. | 600/425 |
| 4,914,589 A | 4/1990 | Crawford | 382/131 |
| 4,953,087 A | 8/1990 | Crawford | 345/419 |
| 5,056,146 A | 10/1991 | Nishide | 382/131 |
| 5,331,553 A | 7/1994 | Muehllehner et al. | 250/363.02 |
| 5,381,518 A | 1/1995 | Drebin et al. | 345/424 |
| 5,559,712 A | 9/1996 | Kihara et al. | 700/118 |
| 5,568,384 A | 10/1996 | Robb et al. | 707/532 |
| 5,782,762 A | 7/1998 | Vining | 600/407 |
| 5,825,364 A | 10/1998 | Redmer | 345/424 |

FOREIGN PATENT DOCUMENTS

| | | | |
|---|---|---|---|
| FR | WO 98/10378 | 3/1998 | G06T/11/00 |
| FR | WO 98/39736 | 3/1998 | G06T/5/00 |

OTHER PUBLICATIONS

First Joint Conference, Grenoble, France Mar. 1997, CVR Med—MRCAS' 97, Automatic Detection of Articular Surfaces in 3D Image through Minimum Subset Random Sampling, Jean–José Jacq and Christian Roux, pp. 73 to 82.

* cited by examiner

Primary Examiner—Andrew W. Johns
Assistant Examiner—Shervin Nakhjavan
(74) Attorney, Agent, or Firm—Wells St. John P.S.

(57) ABSTRACT

A segmentation method and system for medical images of a structure, including at least one substructure are described herein. Examples of such structure and substructures are a vertebra and its spinal canal or a sacrum with its two foramens. The method consists of first providing a plurality of digital images representing consecutive slices of the structure. The set of images is then divided into groups for which initial substructures center position are estimated. Using this information, the pixels corresponding to each substructure and common to all the images in the group are determined. Iterations are performed between these two last steps until the best candidates are obtained. The method consists then in estimating the substructures center position in each image of the group. After the substructures have been identified in each image, the images are then processed to remove noise in the substructures, in the rest of the structure and outside the structure.

30 Claims, 8 Drawing Sheets

METHOD AND SYSTEM FOR SEGMENTATION OF MEDICAL IMAGES

This application claim benefit of provisional application No. 60/087,090 filed May 28, 1998.

FIELD OF THE INVENTION

The present invention relates to medical imaging. More specifically, the present invention is concerned with a segmentation method for medical images of structures such as, for example, bones.

BACKGROUND OF THE INVENTION

Most standard medical scanning devices, for example CT (Computerized Tomography) and MRI (Magnetic Resonance Imagery) scanners produce sets of two dimensional images that represent slices of the imaged anatomical structures. By successively examining these slices, a physician can build, in his mind, a three dimensional representation of the anatomical structure, from which a pathology can then be identified.

Recent advances in the field of medical imaging and computer graphics now allow the computation and the visualization of accurate three dimensional models of anatomical structures. In order to obtain these three dimensional models, every pixels that correspond to the desired structure must be identified in each two dimensional image, which is a long and tedious process given the large number of images that are generally required to obtain an accurate three dimensional representation of an anatomical structure.

The segmentation process, i.e. the identification of the desired pixels, is in general a complex process since some noise usually remains after applying standard image processing techniques, such as thresholding and noise reduction filtering. An additional challenge comes from the fact that some anatomical structures contain cavities or empty regions that must not be filled or merged with adjacent structures during the segmentation process.

According to a conventional segmentation process, a user reviews each image, one by one, using interactive image processing tools, such as thresholding, painting, and filling, in order to identify to which anatomical structure each pixel belongs. Accordingly, this process is long and tedious, and usually requires hours before the three dimensional model of the desired anatomical structure can be obtained.

A semi-automatic segmentation method is proposed in the international PCT application WO 98/39736, filed on Mar. 3, 1998 and naming HIBBARD as the inventor. This method includes the steps of:1) providing digital images corresponding to slices of a structure; 2) drawing by a user of a polygon within a ROI (Region Of Interest) or substructure to be segmented; 3) expanding the polygon by iteratively testing pixels of the images outside of, but adjacent to, the pixels that the polygon currently subtends. Pixels will be added to the polygon if the value of a decision rule function has a predetermined value. The perimeter of the polygon is considered the boundary of the substructure once it is found that none of the perimeter pixels satisfy the decision rule. The last step of the method is to compute the contour of the segmented substructure based on the boundary.

A drawback of Hibbard's method is that the user input involved in step 2 must be done for every slice (image) of the structure, therefore making the segmentation method time consuming. Moreover, to obtain an accurate contour, the user may have to perform step 2 a second time to provide new boundary segments for the polygon, depending of the complexity of the substructure.

More automated and reliable segmentation method and system are thus desirable.

OBJECTS OF THE INVENTION

An object of the present invention is therefore to provide a segmentation method and system free of the above described drawbacks.

Another object of the invention is to provide a reliable segmentation method and system that need less user interactions than the conventional methods and systems of the prior art.

SUMMARY OF THE INVENTION

More specifically, in accordance with the present invention, there is provided a segmentation method, comprising:

receiving a plurality of digital images representing consecutive slices of a structure that includes a substructure;

thresholding the plurality of images;

dividing the plurality of images in at least one group of images;

for each of at least one group of images,
   a) estimating a substructure center position corresponding to the group;
   b) using the substructure center position to find pixels of the substructure common to all images in the group;
   c) for each image in the group,
      c1) using the group substructure center position and the substructure common pixels to estimate a substructure center position corresponding to the image; and
      c2) using the image substructure center position to remove noise both outside and inside the substructure, thereby producing segmented images.

In accordance with an aspect of the present invention, there is also providing a segmentation system comprising:

a first storing device for receiving a plurality of digital images representing consecutive parallel slices of a structure that includes a substructure;

a computer for thresholding the plurality of images;

dividing the plurality of images in at least one group of images;

for each of said at least one group of images,
   a) estimating a substructure center position corresponding to the group;
   b) using said substructure center position to find pixels of the substructure common to all images in the group;
   c) for each image in the group,
      c1) using said group substructure center position and said substructure common pixels to estimate a substructure center position corresponding to the image; and
      c2) using the image substructure center position to remove noise both outside and inside the substructure, thereby producing segmented images.

In accordance with an aspect of the present invention, there is also providing an article of manufacture comprising:

a computer usable medium having a computer readable code means embodied in the medium for segmentation of images, the computer readable program code in the article of manufacture comprising:

computer readable program code means for causing the computer to receive a plurality of digital images representing consecutive parallel slices of a structure; the structure including a substructure;

computer readable program code means for causing the computer to threshold the plurality of images;

computer readable program code means for causing the computer to divide the plurality of images in at least one group of images;

computer readable program code means for causing the computer to estimate a substructure center position corresponding to each of at least one group images;

computer readable program code means for causing the computer to use the substructure center position to find pixels of the substructure common to all images in each group of at least one group of images;

computer readable program code means for causing the computer to use the group substructure center position and the substructure common pixels to estimate a substructure center position corresponding to each image in at least one group of images; and computer readable program code means for causing the computer to use the image substructure center position to remove noise both outside and inside the substructure, thereby producing segmented images.

It is to be noted that in the following the terms pixel and point will both be used to described the smallest distinguishable element of a digital image.

Other objects, advantages and features of the present invention will become more apparent upon reading of the following non restrictive description of preferred embodiments thereof, given by way of example only with reference to the accompanying drawings.

DESCRIPTION OF THE PREFERRED EMBODIMENT

Figure 1:
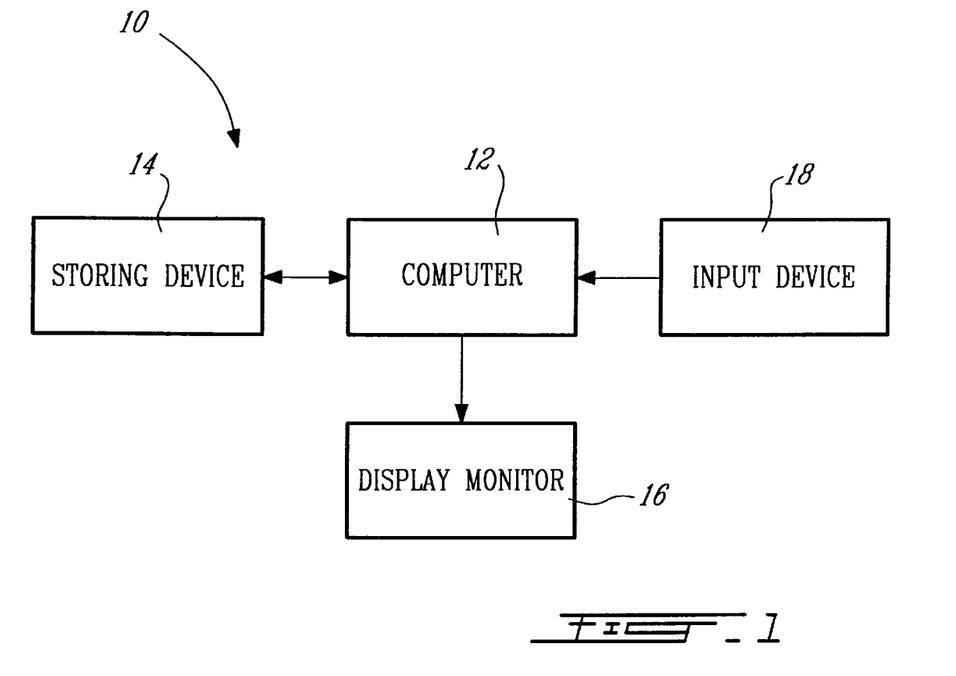
FIG. 1 is a schematic bloc diagram of a segmentation system according to an embodiment of the present invention.

Referring to FIG. 1 of the appended drawings, a segmentation system 10, according to an embodiment of the present invention, will be described.

The segmentation system 10 includes a computer 12, a storing device 14, an output device in the form of a display monitor 16, and an input device 18. The storing device 14, the display monitor 16 and the input device 18 are all connected to the computer 12 via standard connection means, such as, for example, wires.

The computer 12 can be a conventional personal computer or any processing machine that includes a processor, a memory and input/output ports (not shown). The input/output ports may include network connectivity to transfer the images to and from the storing device 14.

The storing device 14 can be, for example, a hard drive, a cd-rom drive or other well known storing means. It can be directly connected to the computer 12 or remotely via a computer network, such as, for example the Internet. According to this embodiment of the invention, the storing device 14 is used to store both the non-segmented medical images as well as the resulting segmented images as computer files. Those files can be stored in any format and resolution that can be read by the computer 12.

The display monitor 16 is used to visualize the medical images both before and after the segmentation process. With the input device 18, the display monitor 16 also allows the input of guidance points by the user as will be described hereinbelow. The display monitor 16 is finally used to display a user interface, to facilitate the interaction between the user and the computer 12. It is believed within the reach of a person of ordinary skills in the art to provide another output device that allows for the visualization of the medical images.

The input device 18 can be a conventional mouse, a keyboard or any other well known input devices or combinations thereof.

Of course, the computer 12 runs a software that embodies the method of the present invention thereof.

Other aspects and characteristics of the system 10 will become more apparent upon reading of the following description of a segmentation method according to an embodiment of the present invention.

Figure 2:
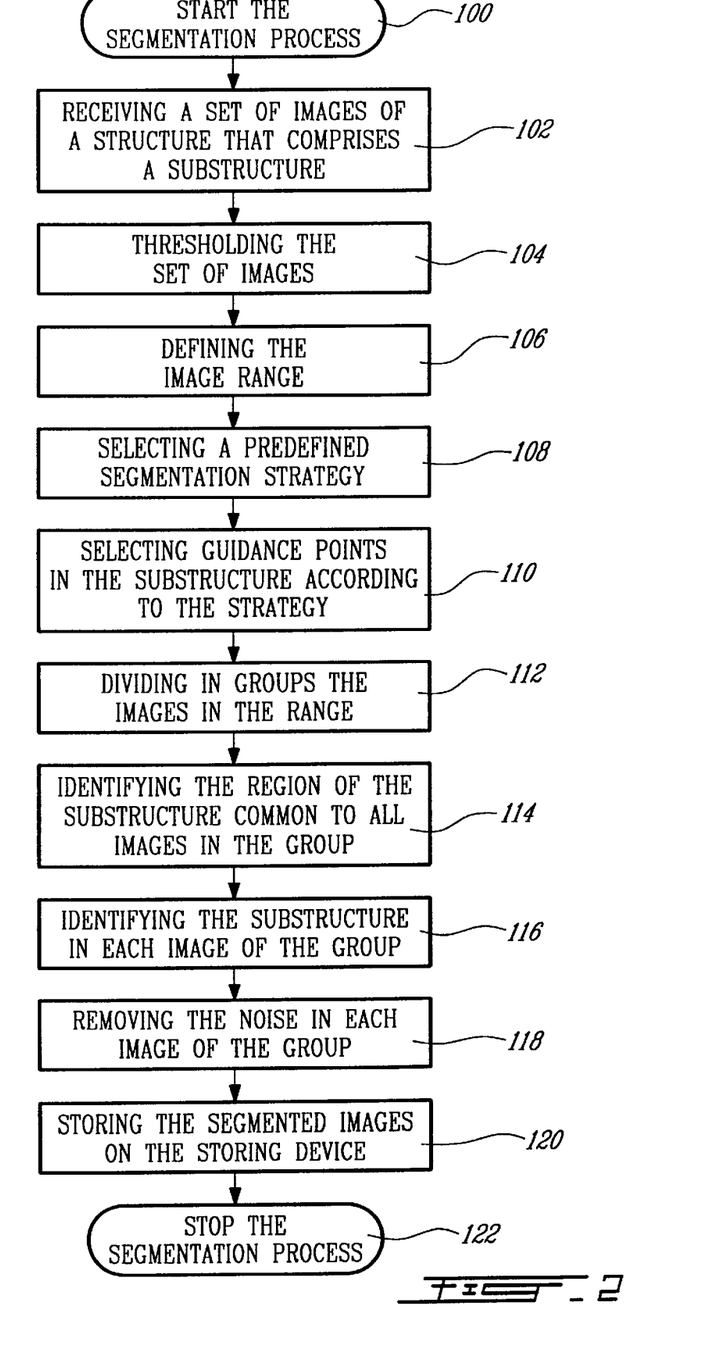
FIG. 2 is a flow chart of a method for segmentation of medical images according to an embodiment of the present invention.

Referring now to FIG. 2 of the appended drawings, generally stated, the method of the present invention consists in performing the following steps in sequence:

100—starting the system 10;
102—receiving a set of images of a structure that comprises a substructure;
104—thresholding the set of images;
106—selecting the image range;
108—selecting a predefined segmentation strategy (optional);
110—selecting guidance points in the substructure according to the strategy;
112—partitioning into groups the images in the range;
for all group of images (114–118):
114—identifying the region of the substructure common to all images in the group;
116—identifying the substructure in each image of the group;
118—removing the noise in each image of the group;
120—storing the segmented images on the storing device; and
122—stopping the system 10.

Before describing these general steps in greater details, it is to be noted that steps 110 to 116 are advantageously performed for every substructure to be identified in the images.

Figure 3:
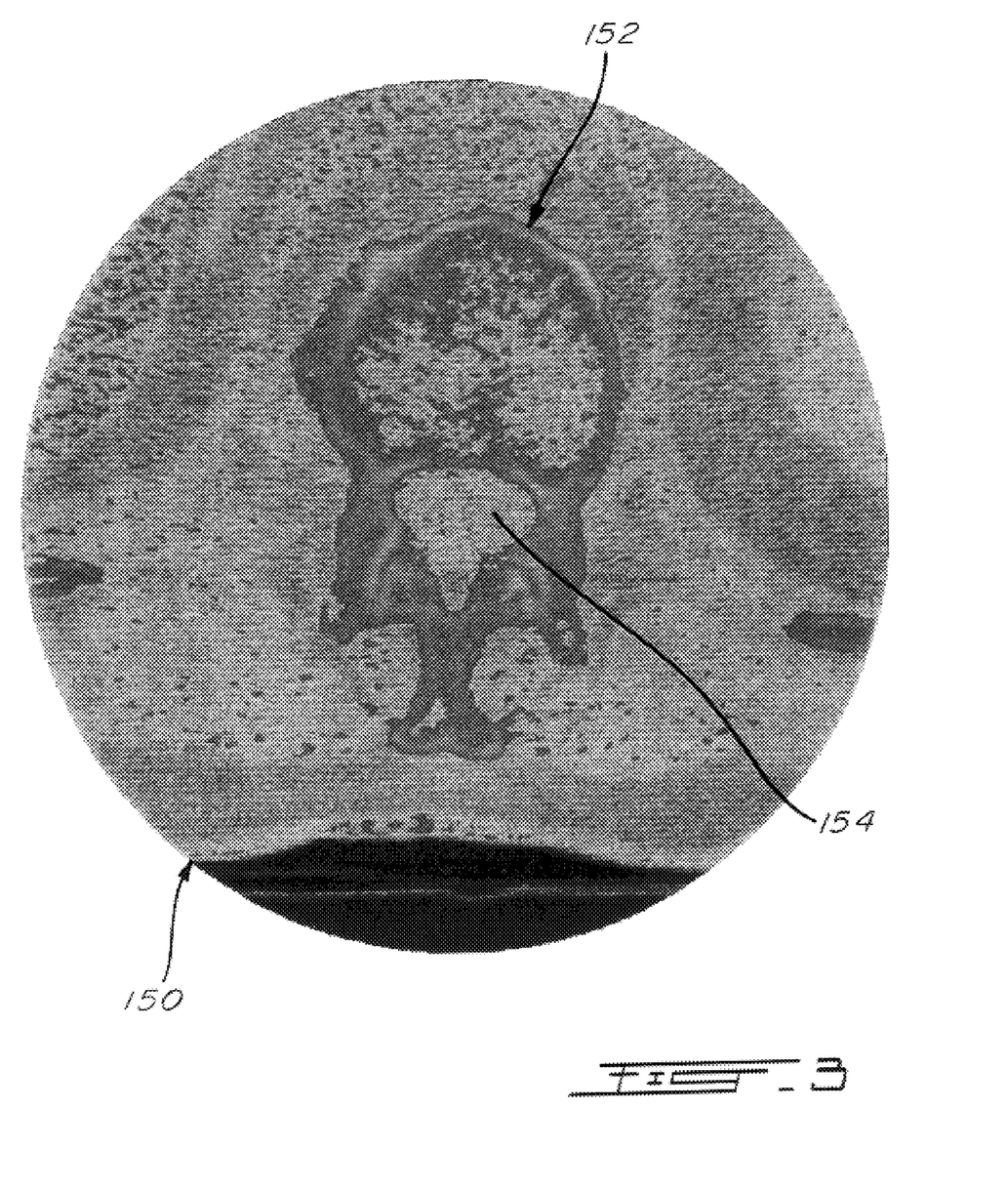
FIG. 3 is a slice image of a lumbar vertebra after the thresholding step.

After the segmentation process 10 has been started (step 100), the step 102 consists in receiving a set of images representing cuts or slices of a structure to the computer 12. An example of an image 150 to be segmented is shown in FIG. 3, where the structure is a lumbar vertebra 152. The substructure that needs to be identified by the segmentation process is, in this example, the spinal canal 154. One can see in FIG. 3, that the vertebra 152 and its spinal canal 154 are not perfectly defined in the images received. In other application, the substructure can be any part of a structure that can be visually isolated from the structure.

The image 150 is a two dimensional array of pixels that has been previously produced by an imaging system, such as, for example a CT scanner or a MRI scanner. It is to be noted that the set of images is provided sequentially in the order that they appear in the three-dimensional object. In other words, successive images come from adjacent slices of the three dimensional object.

In step 104, a thresholding operation is performed on the set of images. The tresholding step 104 consists in selecting pixels on the image that have values between a minimal and a maximal values. Step 104 is performed by the user and can be viewed as a pre-segmentation step that facilitates the up-coming segmentation steps.

The image range is then defined in step 106 by selecting first and last images of the range. If, for example, the set of images comprises slices of the entire spinal cord, the user can select a range of images corresponding only to the lumbar section of the spine, if it is the only section for which the user wants to segment the images. This is simply done by selecting the first and last image of the range.

In step 108, a predefined segmentation strategy can optionally be selected. If, for example, the system 10 is often used for the segmentation of lumbar vertebrae, a segmentation strategy, that takes into account the fact that such vertebrae contain a substructure consisting of a cavity (the spinal canal), can be selected. Of course, these segmentation strategies may be stored and kept for future uses. In the following description, we will assume that the segmentation strategy for lumbar vertebra has been selected. Consequently the present example relates to a structure including a single substructure, even though the invention can deal with more than one such substructure.

After the segmentation strategy has been selected, the user is asked to identify the substructure 154, i.e. the cavity of the spinal canal. Step 110 consists in using the input device 18 to select a point (pixel) included in the representation of the substructure 154, preferably in the first and in the last image in the range of images selected in step 106.

The method according to the present invention can also work if other images in the range are used to select the points. However, if the images are too close in the set to each other, the segmentation process, that will be describe hereinbelow, would not be as efficient. Also, the method according to the present invention can also be implemented if only a single image is used to choose a point for each substructure. However, it has been found advantageous to select such pixels in the first and last image of the range to facilitate the estimation of the center position of the substructure, as will be describe hereinbelow. Also, it is preferable that the guidance points be selected near the center position of the substructure, to increase the speed of the segmentation process.

In step 112, the images selected in the range of images are then divided into smaller groups. One reason to divide the images is to increase the speed of-the segmentation process by taking into account the common structural properties of the structure 152 in adjacent images.

The computer 12 then searches the region of the substructure 154 common to all the images in the group (step 114).

The computer 12 achieves this, first by predicting the group substructure center position. It involves a linear extrapolation between the center of the substructure in the first image of the current group and the center of the previous group, and another extrapolation between the center of the previous group and the center in the last image of the group. The average of the two predicted centers is the predicted center of the substructure in the present group.

The computer 12 can then search all possible candidates that may represent the common region of the group. The prediction is based on the region properties such as the size of the region, the distance of its center from the predicted center and criteria of confinement. All those values and criteria have default values that may be adjusted during the possible candidate searching process. Using criteria of confinement consists in allowing more importance to pixels that are parts of a substructure in the images.

The computer 12 performs iterations of the searchings of the common region and the center point. In the case of the first image of the first group of images, the starting point of this iterative process is one of the guidance point selected in step 110.

If the common region of a group can not be determined by the iterative process using the default values mentioned hereinabove, a dynamic adjustment that generally consists in reducing the number of images in the group and reducing the parameter associated to selection criteria. The adjustment is possible only if a minimal number of images in the group and the minimal size of the substructure to be identified are satisfied.

If the center of the substructure can not be determined with the dynamic adjustment of the values, the computer 12 tries to find the center with less strict values. If, after that, the detection still fails, the user can be asked to enter interactively the substructure position for a given image of the group.

When the identification of the group center position (step 114) is successful and the pixels of the substructure common to every images of the group have been identified, the identification of the position of the substructure 154 in each images of the group (step 116) can then be performed.

The center position of the substructure in each image is determined by taking into account the relative position of each image inside its group and with respect to the previous group. Again, an extrapolation between center position values from the group and the previous group is computed using a weight factor. The weight factor is adjusted with respect to the position of the studied image into the range. The closer to the end is the images, the more the weight factor gives importance to the current group center position.

Figure 4:
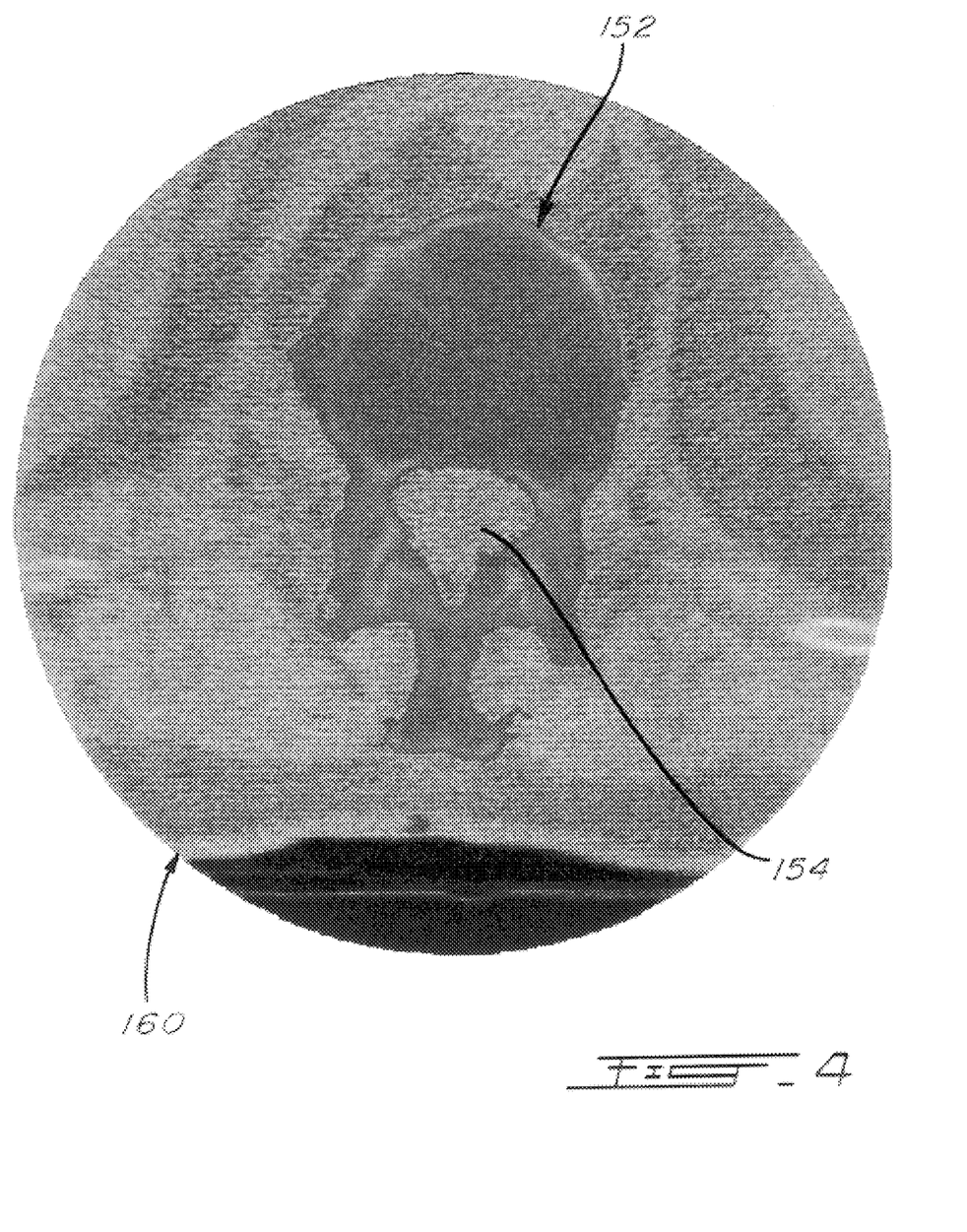
FIG. 4 is the image of FIG. 3 after the noise removing step.

Once the position of the substructure 154 in the structure 152 has been identified in each images 150, it is possible to remove the noise in each image 150 (step 118). The computer first removes noise in the region that is outside a given radius from the center determined in step 116. Afterward, it erases the noise and fills empty regions in the structure 166, knowing the position and size of the substructure. Criteria for removal of noises are based on size, connectivity and relative positioning with respect to the substructure. An example of a processed image 160 is shown in FIG. 4 of the appended drawings. FIG. 4 corresponds to the image 150 of FIG. 3 after step 118 is executed.

Figure 5:
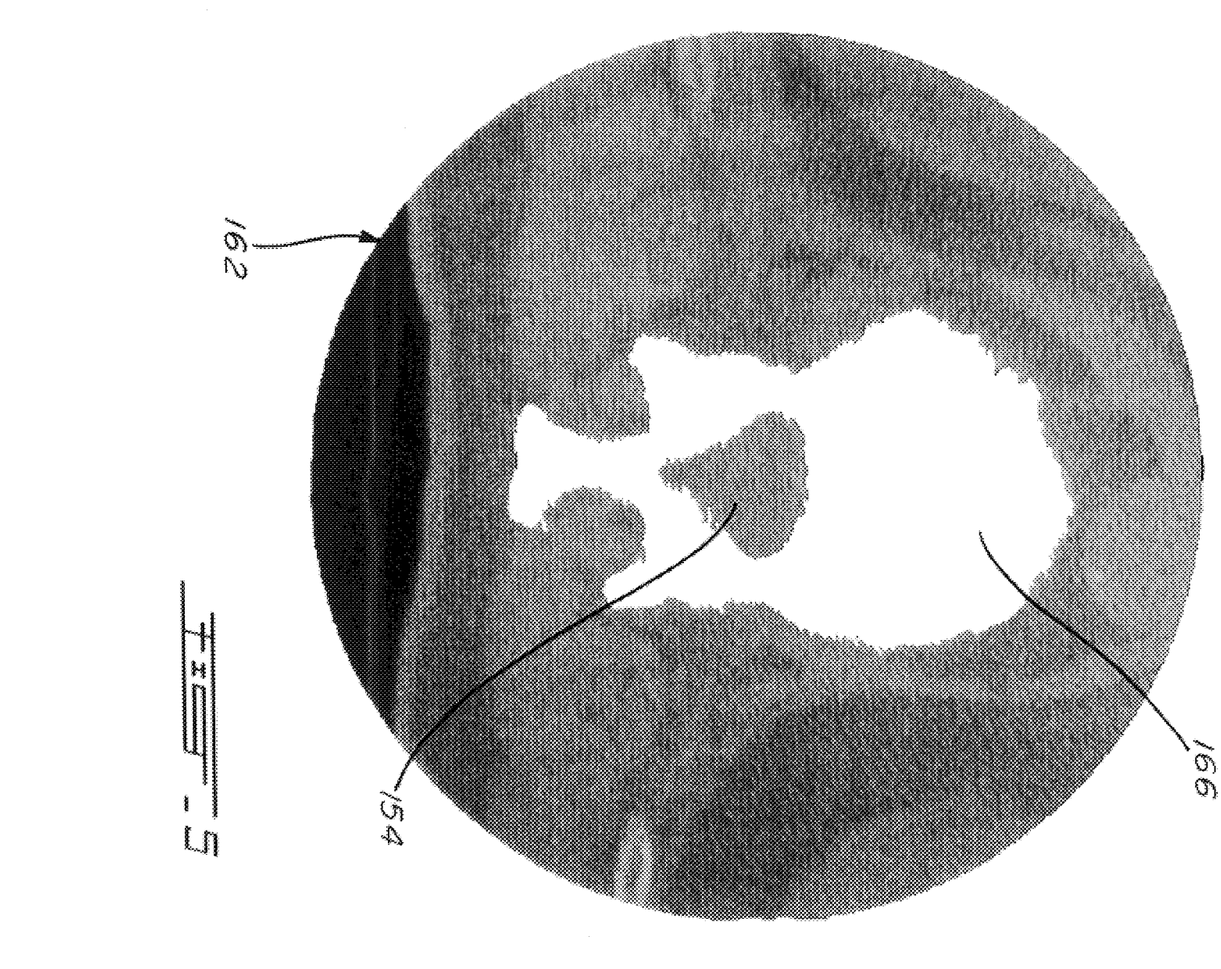
FIG. 5 is the image of FIGS. 3 and 4 in the form of a binary map of the structure superimposed on the grey-level background.

After an image in the range has been processed and the substructure is well defined, the resulting images can be stored on the storing device 14 of the system 10 in the form of a contour map or as a filled structure (step 120). An example of a filled structure image 162 (or binary map)

corresponding to the images 150 and 160 is shown in FIG. 5, where each pixel of the image 162 is either part of the substructure 154, or of the rest of the structure (see region 166, in white on FIG. 5).

Once all the images of the range have been segmented, a person skilled in the art can build a three dimensional model of the structure, comprising the substructure, by using the segmented images 162 and a conventional three-dimensional reconstruction system.

Figure 6:
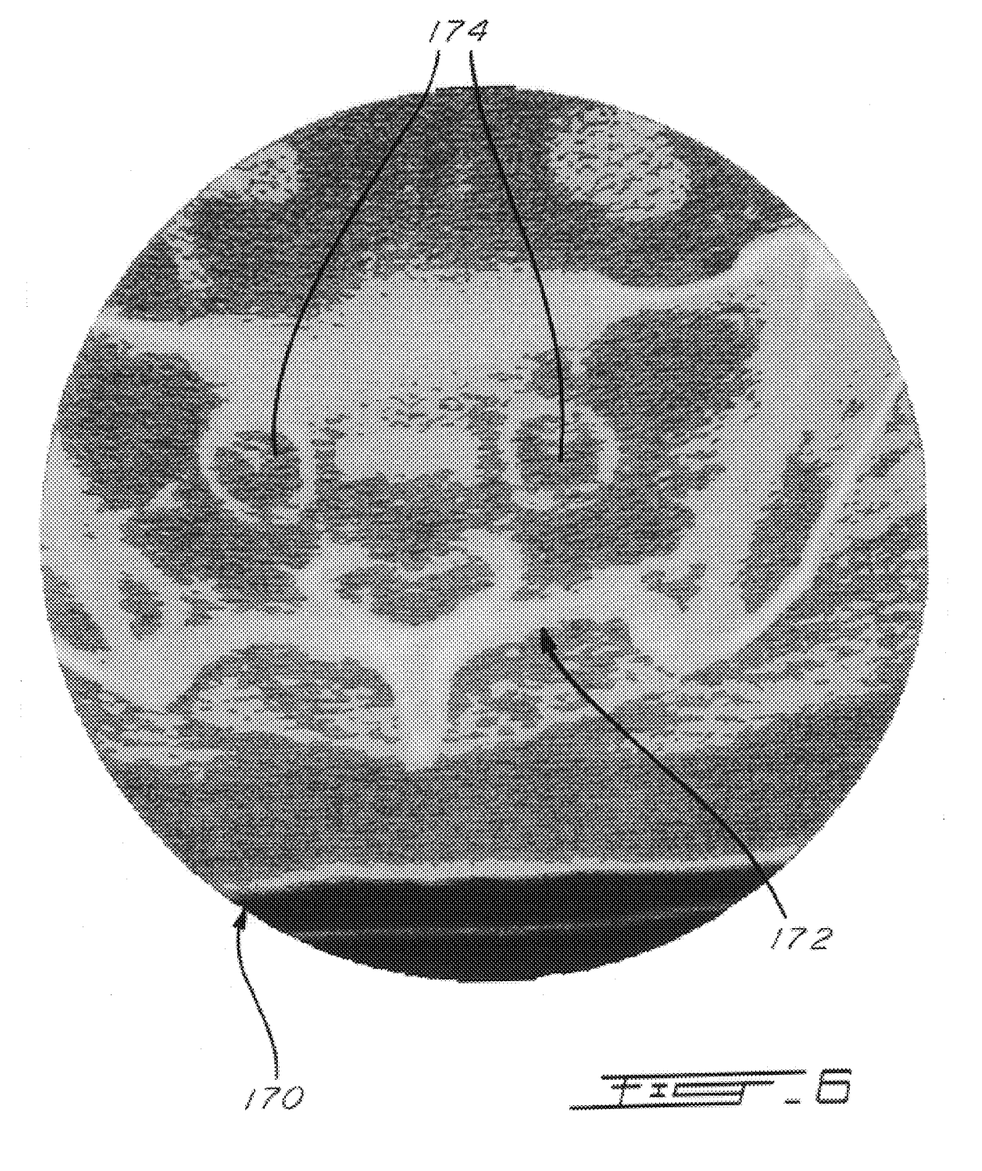
FIG. 6 is a slice image of a sacrum after the thresholding step.
Figure 7:
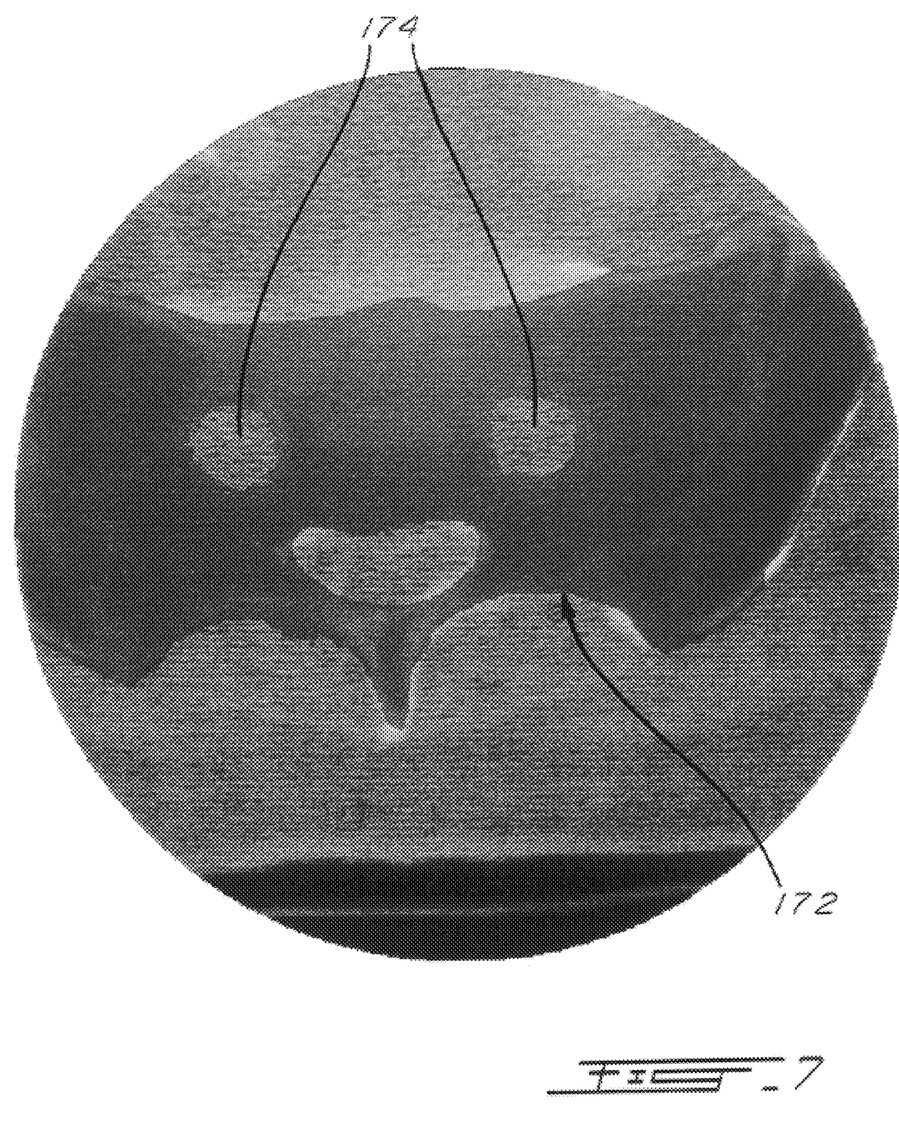
FIG. 7 is the image of FIG. 6 after the noise removing step.
Figure 8:
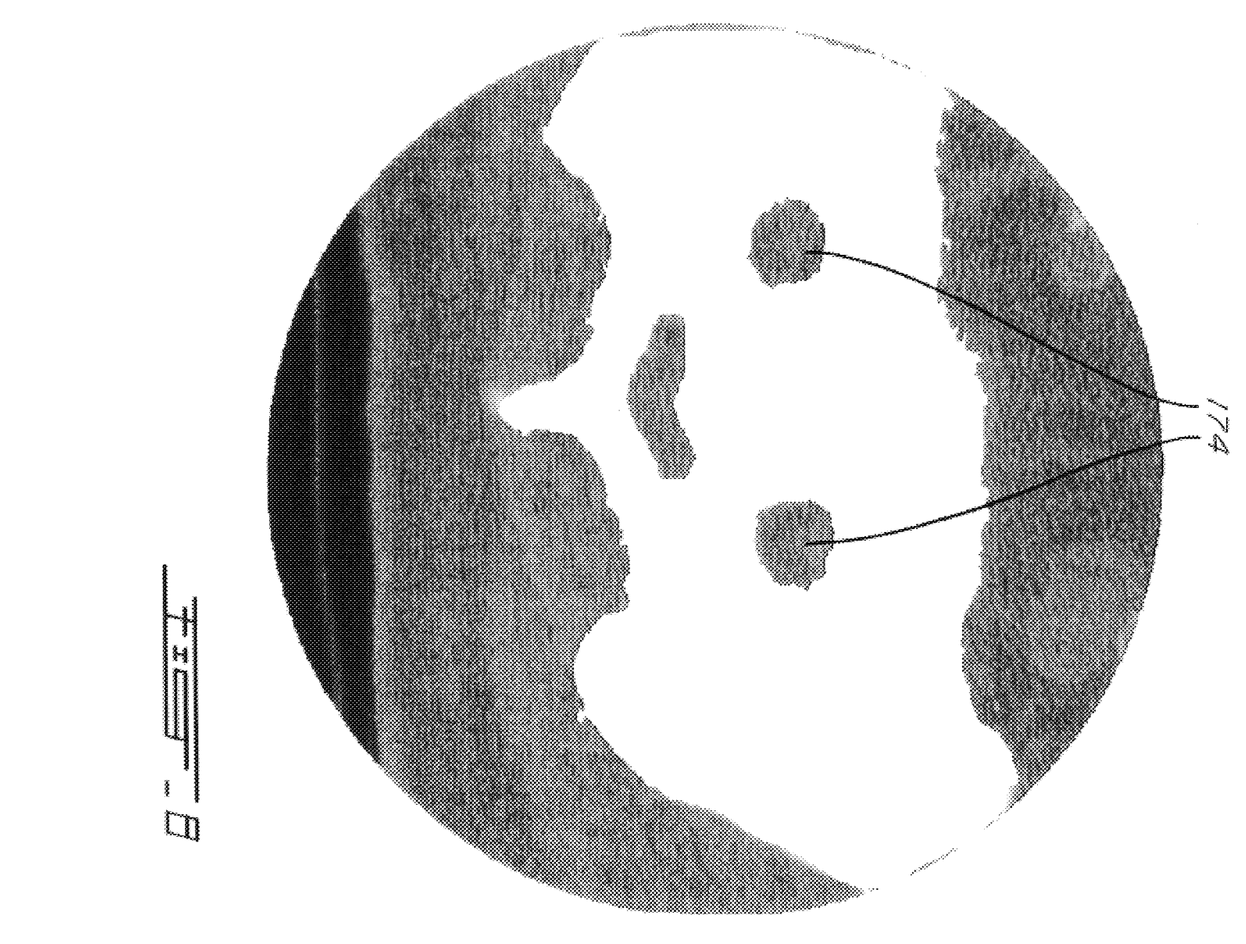
FIG. 8 is the image of FIGS. 6 and 7 in the form of a binary map of the structure superimposed on the grey-level background.

FIGS. 6, 7 and 8 of the appended drawings illustrate the use of the method according to this invention to segment medical images 170 of the sacrum 172 comprising the two foramens 174.

In the case of such a structure, all the step from 100 to 120 are executed as described hereinabove, except for the following differences:

in step 108 another predefined segmentation strategy is selected to take into account the fact that there are now two additional cavities in the structures to identify in the images: the two foramens 174; and in step 110, the user must now select additional guidance points for each foramen 174.

FIG. 7 shows the image of FIG. 6 after the noise removing step, while FIG. 8 shows a binary map superimposed on a grey-level background and corresponding to FIG. 7.

Although the present embodiment has been described with bones as the structure, the structure represented on the images can be any physical object having at least one substructure that can be independently identified.

Although the present invention has been described hereinabove by way of preferred embodiments thereof, it can be modified, without departing from the spirit and nature of the subject invention as defined in the appended claims.

What is claimed is:

1. A segmentation method in a computer system, comprising:

receiving a plurality of digital images representing consecutive slices of a structure; said structure including a substructure;

thresholding said plurality of images;

dividing said plurality of images in at least one group of images;

for each of said at least one group of images,
   a) estimating a substructure center position corresponding to said group;
   b) using said substructure center position to find pixels of the substructure common to all images in said group;
   c) for each image in said group,
      c1) using said group substructure center position and said substructure common pixels to estimate a substructure center position corresponding to said image; and
      c2) using said image substructure center position to remove noise both outside and inside said substructure, thereby producing segmented images.

2. A segmentation method as recited in claim 1, further comprising defining the image range before dividing said plurality of images in at least one group of images.

3. A segmentation method as recited in claim 2, wherein said estimation of said substructure center position corresponding to said image includes taking into account the relative position of said image in said image range.

4. A segmentation method as recited in claim 1, further comprising selecting a predefined segmentation strategy before dividing said plurality of images in at least one group.

5. A segmentation method as recited in claim 1, further comprising selecting guidance points in the substructure before dividing said plurality of images in at least one group.

6. A segmentation method as recited in claim 1, wherein said finding pixels of the substructure common to all images in said group includes searching among a plurality of common region candidates.

7. A segmentation method as recited in claim 1, wherein dynamic adjustment is used in finding said pixels of the substructure common to all images in said group.

8. A segmentation method as recited in claim 1, wherein said estimation of said substructure center position corresponding to said image includes taking into account the relative position of said image in said group.

9. A segmentation method as recited in claim 1, further comprising storing said segmented images on a storing device.

10. A segmentation method as recited in claim 9, wherein said images are stored in the form of a contour map.

11. A segmentation method as recited in claim 9, wherein said images are stored in the form of a filled structure.

12. A segmentation method as recited in claim 1, wherein said structure is a bone.

13. A segmentation method as recited in claim 12, wherein said bone is part of the spinal cord.

14. A segmentation method as recited in claim 1, wherein said substructure is a vertebra and said substructure is the spinal canal.

15. A segmentation method as recited in claim 1, wherein said substructure is the sacrum and said substructure is the foramen.

16. A segmentation system comprising:

a first storing device for receiving a plurality of digital images representing consecutive parallel slices of a structure; said structure including a substructure;

a computer for thresholding said plurality of images;

dividing said plurality of images in at least one group of images;

for each of said at least one group of images,
   a) estimating a substructure center position corresponding to said group;
   b) using said substructure center position to find pixels of the substructure common to all images in said group;
   c) for each image in said group,
      i) using said group substructure center position and said substructure common pixels to estimate a substructure center position corresponding to said image; and
      ii) using said image substructure center position to remove noise both outside and inside said substructure, thereby producing segmented images.

17. A segmentation system as recited in claim 16, wherein said first storing device further used for storing said segmented images.

18. A segmentation system as recited in claim 16, further comprising a second storing device to store said segmented images.

19. A segmentation system as recited in claim 18, wherein said second storing device is selected from the group consisting of a hard-drive, a cd-rom and a computer memory.

20. A segmentation system as recited in claim 18, wherein said second storing device is remotely connected to the computer via a network.

21. A segmentation system as recited in claim 16, wherein said first storing device is selected from the group consisting of a hard-drive, a cd-rom and a computer memory.

22. A segmentation system as recited in claim 16, further comprising an output device for displaying said plurality of images and said for displaying said segmented images.

23. A segmentation system as recited in claim 22, wherein said output device is a display monitor.

24. A segmentation system as recited in claim 16, further comprising at least one input device for selecting guidance points; said computer further using said guidance points for estimating said substructure center position corresponding to said group.

25. A segmentation system as recited in claim 24, wherein said at least one input device includes a keyboard.

26. A segmentation system as recited in claim 24, wherein said at least one input device includes a mouse.

27. A segmentation system as recited in claim 16, wherein said first storing device is remotely connected to the computer via a network.

28. A segmentation device as recited in claim 22, wherein said display monitor is remotely connected to the computer via a network.

29. A segmentation system comprising:

a first storing device for receiving a plurality of digital images representing consecutive parallel slices of a structure; said structure including a substructure;

means for thresholding said plurality of images;

means for dividing said plurality of images in at least one group of images;

means for estimating substructure center positions corresponding to said groups;

means for using said substructure center position to find pixels of the substructure common to all images in said group;

means for using said group substructure center position and said substructure common pixels to estimate a substructure center position corresponding for each of said images in said group; and means for using said image substructure center position to remove noise both outside and inside said substructure, thereby producing segmented images.

30. An article of manufacture comprising:

a computer usable medium having a computer readable code means embodied in said medium for segmentation of images, the computer readable program code in said article of manufacture comprising:

computer readable program code means for causing the computer to receive a plurality of digital images representing consecutive parallel slices of a structure; said structure including a substructure;

computer readable program code means for causing the computer to threshold said plurality of images;

computer readable program code means for causing the computer to divide said plurality of images in at least one group of images;

computer readable program code means for causing the computer to estimate a substructure center position corresponding to each of said at least one group of images;

computer readable program code means for causing the computer to use said substructure center position to find pixels of the substructure common to all images in each of said group of at least one group of images;

computer readable program code means for causing the computer to use said group substructure center position and said substructure common pixels to estimate a substructure center position corresponding to each image in said at least one group of images; and computer readable program code means for causing the computer to use said image substructure center position to remove noise both outside and inside said substructure, thereby producing segmented images.

* * * * *